Jan. 10, 1961 D. I. KOSOWSKY ET AL 2,967,958

HIGH FREQUENCY CRYSTALS

Filed Nov. 1, 1957

Inventors
David I. Kosowsky
Francis Earle Clark
by Robert S. Toperzer
Atty.

2,967,958

HIGH FREQUENCY CRYSTALS

David I. Kosowsky, West Newton, and Francis Earle Clark, Marlboro, Mass., assignors to Hycon Eastern, Inc., Cambridge, Mass., a corporation of Delaware Filed Nov. 1, 1957, Ser. No. 693,829

2 Claims. (Cl. 310—9.4)

Figure 1A:
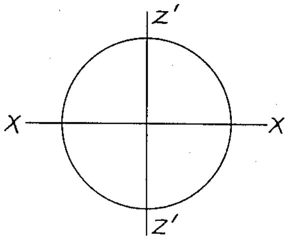

This invention relates generally to piezoelectric elements and in particular it relates to quartz crystals for relatively high frequency use, that is above approximately five megacycles.

As compared with other forms of wave filtering devices, filters embodying piezoelectric crystals have the advantage of being more compact and reliable, and especially is this true of filters for use at frequencies above approximately five megacycles. The difficulty however, is that most commercially available high frequency crystals have a large number of inharmonic overtones, within a frequency range of a few tenths of one percent of the fundamental frequency, that are strongly driven. Although such crystals are suitable for oscillator applications because they will not sustain oscillations at frequencies corresponding to the inharmonic overtones, in general, the presence of these spurious responses will make the crystals useless for filter applications. In order for a crystal to be usable in a filter, it must at a very minimum have no measurable spurious responses within the pass band for which the filter is designed. Furthermore, spurious responses or modes in the stop bands must be relatively weak as compared with the fundamental mode of oscillation.

There have been disclosed in the literature a number of different techniques for eliminating unwanted or spurious responses of crystals in the vicinity of their fundamental frequencies but the problem is that for the most part, these techniques relate to dimensioning, that is beveling, contouring, shaping and the like. As a consequence they are unsuitable for thickness shear (AT, BT,) crystals whose resonant frequencies are in excess of approximately five megacycles, since the frequency controlling dimension or thickness of the crystals is so small at these frequencies that it is mechanically impracticable if not impossible to carry out these dimensioning procedures.

It is an object of the present invention, therefore, to provide thickness shear crystal resonators which are sufficiently free from spurious responses as to be entirely satisfactory for filter applications in the frequency region above approximately five megacycles.

Figure 1B:
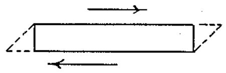
Figure 1C:
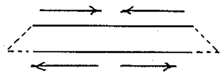
Figure 2:
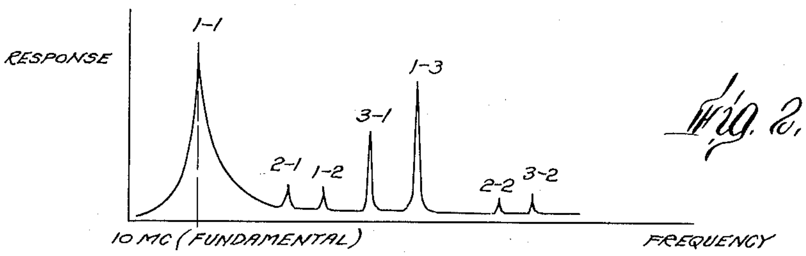
Figure 3:
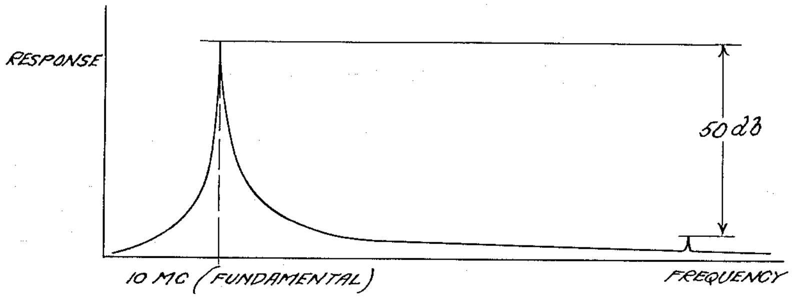

The novel features of the invention together with further objects and advantages thereof will become more readily apparent from the following description taken in connection with the accompanying drawing. In the drawing:

Fig. 1*a* is a plan view of a crystal plate;

Figs. 1*b* and 1*c* are cross-sectional views taken on line XX of Figure 1*a*;

Fig. 2 is a graph illustrating the response characteristic of a conventional high frequency crystal; and Fig. 3 is a graph of the response characteristic of a high frequency crystal in accordance with the invention.

It is a well established fact that undesirable responses of high frequency thickness shear crystals arise from inharmonic overtones. This phenomenon may be better understood with reference to Figs. 1*a* through *c*. In particular Figure 1*a* shows a circular AT-cut thickness shear quartz crystal whose horizontal and vertical axes through the crystal face have been designated X and Z′, respectively, to identify the crystallographic orientation. Figure 1*b* shows, first how the fundamental thickness shear mode is produced, namely by the sliding or shearing of the major faces in opposite directions as illustrated. A similar phenomena occurs along the Z′ axis so that this fundamental mode will be denoted 1—1.

Slightly above the fundamental frequency, the crystal will vibrate as shown in Figure 1*c*. From a vibrational standpoint the major faces along the X axis may be regarded as "split" into two subsections. Along the Z′ axis, on the other hand, there is no "splitting" so that this mode will be denoted 2—1. At a still higher frequency, the Z′ axis "splits" into two subsections of vibration without any "splitting" occurring along the X axis. This gives rise to the 1—2 mode. Further increases in frequency will produce multiple "splitting" along both X and Z′ axes which accounts for the presence of such modes as 3—1, 1—3, 2—2, 3—2, etc., where the first digit denotes the number of subsections along the Z′ axis. The overall response or activity versus frequency characteristic of the crystal resonator of Figure 1 is illustrated in Figure 2 from which it will be observed that the spurious responses are fairly strong as compared with the fundamental and occur fairly close in to the fundamental frequency.

By probing, that is mechanically disturbing a crystal plate at different points on its surface while it is being excited at a selected frequency, and noting the amount of decrease in its vibrational activity as a result of the mechanical disturbance in each case, we have found that most of the vibrational activity is centered in a region about the geometric center of the crystal face. We have also found the amount of activity present to be greatest at the center and to decrease rapidly towards the edge of the plated areas defining the electrodes of the crystal, there being very little if any vibration beyond the plated regions. The same is true whether the crystal is excited at frequencies corresponding to various of the inharmonic overtones or at its fundamental frequency. This is apparently because the "splitting" of the major face into subsections at the inharmonic frequencies occurs almost entirely within the region of the plated area.

According to the invention, we are able substantially to eliminate spurious responses of a high frequency thickness shear crystal resulting from inharmonic overtones by appropriate control of the size of the plated electrode region and of the crystal itself. In particular we have found that the electrode diameter in mils must be approximately equal to or less than that specified by the formula $$E=\frac{1500}{F}$$

where F is the frequency in megacycles. This is much smaller than the electrode diameters or "spot sizes" that have been used heretofore which have been in the neighborhood of one-quarter inch or more in order to keep the effective series resistance of the units below a prescribed minimum, as is generally required for oscillator applications. Also we have found that the diameter D of the crystal should follow approximately the relation D equals two times E, the diameter of the electrodes.

Actually, values of D and E equal to, rather than less than those given by the formula are preferred, because even though the spurious mode activity of the crystal will not increase when D and E have lesser values, nevertheless the equivalent motional capacitance of the crystal will be smaller, and in some cases so small as to make the crystal unusable in any but extremely narrow band crystal filter applications. Where the crystal is to be employed at frequencies which are harmonics of their fundamental frequencies, however, then the electrode diameter E, and if possible the plate diameter D preferably should be reduced. By way of example, it has been found that for third harmonic operation, the optimum values for both D and E are in the neighborhood of from 20 to 30 percent less than those specified by the formula. For fifth harmonic operation the optimum values are as much as from 30 to 50 percent less.

Slightly lower values than those given by the formula are preferable in the fundamental frequency range of from five to approximately nine megacycles. This is due to the fact that in this range, high frequency thickness shear crystals are normally contoured or edge bevelled, which modifies their vibrational pattern somewhat. Various such compensational variants that are within the spirit and scope of the invention will no doubt suggest themselves to those skilled in the art, and therefore the invention should not be deemed to be limited only to what has been described in the foregoing, but should be deemed to be limited only by the scope of the appended claims.

What is claimed is:

1. A thickness shear piezoelectric crystal for use in a frequency selective filter, said crystal having a thickness adapted to produce resonance of the crystal in the fundamental mode at a frequency in the range above five megacycles, plated electrodes with a maximum diameter E in thousands of an inch as given by the formula $$E=\frac{1500}{F}$$

where F is the resonant frequency of the crystal in megacycles, and having a diameter which is approximately twice the plated electrode diameter.

2. A thickness shear piezoelectric crystal for use in a frequency selective filter, said crystal having a thickness adapted to produce resonance of the crystal in the fundamental mode at a frequency in the range above five megcycles, plated electrodes whose diameter is approximately equal to the value E in thousands of an inch as given by the formula $$E=\frac{1500}{F}$$

where F is the resonant frequency of the crystal in megacycles, and having a diameter which is approximately twice the plated electrode diameter.

References Cited in the file of this patent

UNITED STATES PATENTS

| | | |
|---|---|---|
| 1,822,928 | Hund | Sept. 15, 1931 |
| 2,249,933 | Bechmann | July 22, 1941 |
| 2,343,059 | Hight | Feb. 29, 1944 |
| 2,412,030 | Baldwin | Dec. 3, 1946 |
| 2,467,353 | Wolfskill | Apr. 12, 1949 |